US012651555B2

(12) United States Patent
Lee et al.

(10) Patent No.: US 12,651,555 B2
(45) Date of Patent: Jun. 9, 2026

(54) PIXEL AND DISPLAY DEVICE INCLUDING THE SAME

(71) Applicant: Samsung Display Co., Ltd., Yongin-Si (KR)

(72) Inventors: Ji Young Lee, Yongin-si (KR); So Hae Kim, Yongin-si (KR); Ji Song Chae, Yongin-si (KR); Sang Gu Lee, Yongin-si (KR); Yong Woo Lee, Yongin-si (KR); Hyung Uk Cho, Yongin-si (KR); Hyun Young Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/789,753

(22) Filed: Jul. 31, 2024

(65) Prior Publication Data

US 2025/0054437 A1 Feb. 13, 2025

(30) Foreign Application Priority Data

Aug. 11, 2023 (KR) ........................ 10-2023-0105700

(51) Int. Cl.
*G09G 3/32* (2016.01)
*G09G 3/3266* (2016.01)
*G09G 3/3275* (2016.01)

(52) U.S. Cl.
CPC ............. *G09G 3/32* (2013.01); *G09G 3/3266* (2013.01); *G09G 3/3275* (2013.01);
(Continued)

(58) Field of Classification Search
CPC .... A61K 2800/5424; A61K 2800/5426; A61K 2800/884; A61K 8/8111; A61K 8/8135; A61K 8/8147; A61K 8/8158; A61K 8/817; A61K 8/8194; A61K 8/84; A61K 8/898; A61Q 5/065; A61Q 5/10;
(Continued)

(56) References Cited

U.S. PATENT DOCUMENTS

| | | | |
|---|---|---|---|
| 7,561,124 | B2 | 7/2009 | Kwak et al. |
| 10,013,917 | B2 | 7/2018 | Kim et al. |

(Continued)

FOREIGN PATENT DOCUMENTS

| | | | |
|---|---|---|---|
| KR | 10-0686334 | B1 | 2/2007 |
| KR | 10-2016-0103567 | A | 9/2016 |
| KR | 10-2457757 | B1 | 10/2022 |

*Primary Examiner* — Nitin Patel
*Assistant Examiner* — Amen W Bogale
(74) *Attorney, Agent, or Firm* — Innovation Counsel LLP

(57) ABSTRACT

A pixel according to embodiments of the present inventive concept includes a first transistor having a gate electrode connected to a first node; a light emitting element connected between the second electrode of the first transistor and a second power source line; a second transistor connected between the first node and a data line; a third transistor connected between the first electrode of the first transistor and a second node; a fourth transistor connected between the first power source line and the second node; and a first capacitor connected between the first node and the second node, and a reference power source and a voltage of a data signal are sequentially supplied to the data line during a horizontal period.

20 Claims, 17 Drawing Sheets

(52) U.S. Cl.
CPC ............... *G09G 2300/0426* (2013.01); *G09G 2310/0267* (2013.01); *G09G 2310/0275* (2013.01)

(58) Field of Classification Search
CPC ... G09G 2300/0426; G09G 2310/0267; G09G 2310/0275; G09G 3/32; G09G 3/3233; G09G 3/3266; G09G 3/3275
See application file for complete search history.

(56) References Cited

U.S. PATENT DOCUMENTS

| | | | | |
|---|---|---|---|---|
| 10,062,321 | B2 | 8/2018 | Na et al. | |
| 10,818,230 | B1 * | 10/2020 | Lu | G09G 3/3233 |
| 2012/0019498 | A1 * | 1/2012 | Jeong | G09G 3/3233 345/76 |
| 2016/0240145 | A1 * | 8/2016 | Jeong | G06F 1/04 |
| 2017/0061876 | A1 * | 3/2017 | Cho | G09G 3/3233 |
| 2021/0242292 | A1 * | 8/2021 | Tsuboi | H10K 59/1216 |

* cited by examiner

PIXEL AND DISPLAY DEVICE INCLUDING THE SAME

CROSS-REFERENCE TO RELATED APPLICATION

The application claims priority to and the benefit of Korean Patent Application No. 10-2023-0105700, filed Aug. 11, 2023, which is hereby incorporated by reference for all purposes as if fully set forth herein.

BACKGROUND

1. Field

The present inventive concept relates to a pixel and a display device including the same.

2. Discussion

As information technology develops, the importance of a display device as a connection medium between a user and information is being emphasized. In response to this, the use of display devices such as a liquid crystal display device and an organic light emitting display device is increasing.

Recently, a high-resolution display panel is required for various display devices including a head-mounted display device (HMD).

SUMMARY

An object of the present inventive concept is to provide a pixel applicable to a high-resolution display panel and a display device including the same.

A pixel according to embodiments of the present inventive concept may include a first transistor having a first electrode electrically connected to a first power source line, a second electrode, and a gate electrode connected to a first node; a light emitting element connected between the second electrode of the first transistor and a second power source line; a second transistor connected between the first node and a data line and having a gate electrode electrically connected to a first scan line; a third transistor connected between the first electrode of the first transistor and a second node and having a gate electrode electrically connected to a first emission control line; a fourth transistor connected between the first power source line and the second node and having a gate electrode electrically connected to a second emission control line; and a first capacitor connected between the first node and the second node, and a reference power source and a voltage of a data signal may be sequentially supplied to the data line during a horizontal period.

According to an embodiment, the pixel may further include a fifth transistor connected between a first electrode of the light emitting element and the second power source line and having a gate electrode electrically connected to a second scan line.

According to an embodiment, the pixel may further include a second capacitor connected between the second node and the second scan line.

According to an embodiment, the pixel may further include a third capacitor connected between the second node and the first power source line.

According to an embodiment, the horizontal period may include a first period, a second period, a third period, a fourth period and a fifth period, the fifth transistor may be turned on during the first to third periods, the second transistor may be turned on during the first to fourth periods, the fourth transistor may be turned off during the second to fourth periods, and the third transistor may be turned off during the third to fifth periods.

According to an embodiment, the reference power source may be supplied to the data line during the first and second periods, and the voltage of the data signal may be supplied to the data line during the third and fourth periods.

According to an embodiment, the horizontal period may include a first period, a second period, a third period, a fourth period and a fifth period, the fifth transistor may be turned on during the first to third periods, the second transistor may be turned on during the first to fourth periods, the fourth transistor may be turned off during the first to fourth periods, and the third transistor may be turned off during the third to fifth periods.

According to an embodiment, the reference power source may be supplied to the data line during the first and second periods, and the voltage of the data signal may be supplied to the data line during the third and fourth periods.

According to an embodiment, the pixel may further include a second capacitor connected between the second node and the first emission control line.

According to an embodiment, a first driving power source may be supplied to the first power source line, and a second driving power source lower than the first driving power source may be supplied to the second power source line, and the reference power source may have a lower voltage than the first driving power source.

According to an embodiment, the pixel may further include a fifth transistor connected between a first electrode of the light emitting element and a third power source line and having a gate electrode electrically connected to a second scan line; and a second capacitor connected between the second node and the second scan line.

According to an embodiment, an initialization power source may be supplied to the third power source line, and the light emitting element may be turned off when the initialization power source is supplied to the first electrode of the light emitting element.

A display device according to embodiments of the present inventive concept may include pixels connected to first scan lines, second scan lines, first emission control lines, second emission control lines, and data lines; a scan driver driving the first scan lines and the second scan lines; an emission driver driving the first emission control lines and the second emission control lines; and a data driver driving the data lines. A pixel located on an i-th horizontal line (i is a natural number) and a j-th vertical line (j is a natural number) may include a first transistor having a first electrode electrically connected to a first power source line, a second electrode, and a gate electrode connected to a first node; a light emitting element connected between the second electrode of the first transistor and a second power source line; a second transistor connected between the first node and a j-th data line and turned on when an enable first scan signal is supplied to an i-th first scan line; a third transistor connected between the first electrode of the first transistor and a second node and turned off when a disable first emission control signal is supplied to an i-th first emission control line; a fourth transistor connected between the first power source line and the second node and turned off when a disable second emission control signal is supplied to an i-th second emission control line; and a first capacitor connected between the first node and the second node. A horizontal period in which the pixel is driven may include a first period, a second period, a third period, a fourth period, and a fifth period, and the data driver may supply a voltage of a reference power source to the j-th data line during the first and second periods, and supply a voltage of a data signal to the j-th data line during the third and fourth periods.

According to an embodiment, the pixel may further include a fifth transistor connected between a first electrode of the light emitting element and the second power source line and turned on when an enable second scan signal is supplied to an i-th second scan line.

According to an embodiment, the scan driver may supply the enable first scan signal to the i-th first scan line during the first to fourth periods, and supply the enable second scan signal to the i-th second scan line during the first to third periods, and the emission driver may supply the disable first emission control signal to the i-th first emission control line during the third to fifth periods, and supply the disable second emission control signal to the i-th second emission control line during the second to fourth periods.

According to an embodiment, the scan driver may supply the enable first scan signal to the i-th first scan line during the first to fourth periods, and supply the enable second scan signal to the i-th second scan line during the first to third periods, and the emission driver may supply the disable first emission control signal to the i-th first emission control line during the third to fifth periods, and supply the disable second emission control signal to the i-th second emission control line during the first to fourth periods.

According to an embodiment, the display device may further include a second capacitor connected between the second node and the i-th second scan line.

According to an embodiment, the display device may further include a third capacitor connected between the second node and the first power source line.

According to an embodiment, the display device may further include a second capacitor connected between the second node and the i-th first emission control line.

According to an embodiment, the display device may further include a fifth transistor connected between a first electrode of the light emitting element and a third power source line and turned on when an enable second scan signal is supplied to an i-th second scan line; and a second capacitor connected between the second node and the i-th second scan line.

Objects of the present inventive concept are not limited to the objects mentioned above, and other technical objects not mentioned will be clearly understood by those skilled in the art from the description below.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
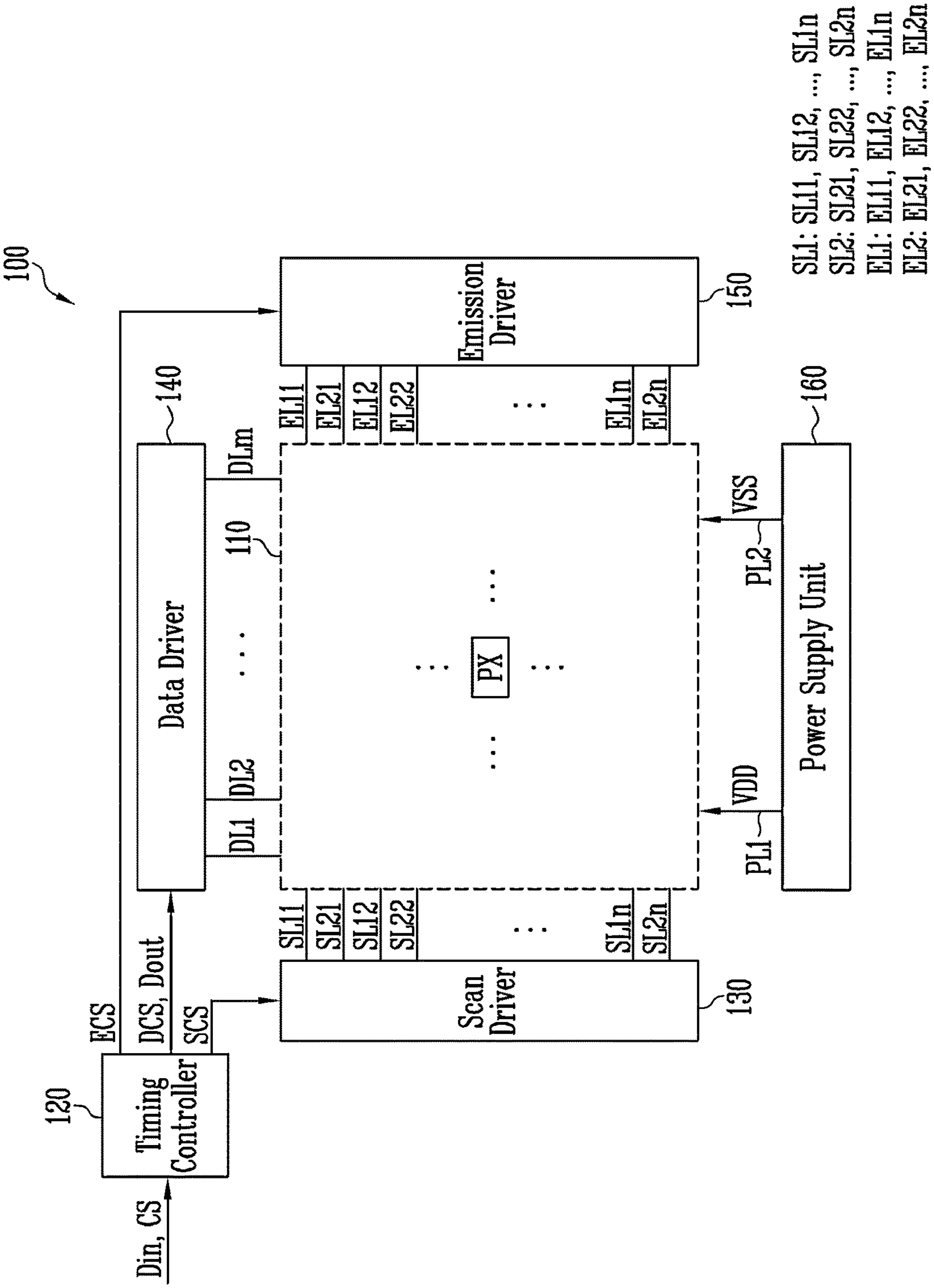
FIG. 1 is a diagram illustrating a display device according to an embodiment of the present inventive concept.

Hereinafter, various embodiments of the present inventive concept will be described in detail with reference to the accompanying drawings so that those of ordinary skill in the art may easily implement the present inventive concept. The present inventive concept may be embodied in various different forms and is not limited to the embodiments described herein.

In order to clearly describe the present inventive concept, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present inventive concept is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, and may optionally be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

The term "connection" between two components may mean that both of an electrical connection and a physical connection are used inclusively, but the present inventive concept is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the present inventive concept.

Meanwhile, the present inventive concept is not limited to the embodiments disclosed below, and may be modified in various forms and may be implemented. In addition, each of the embodiments disclosed below may be implemented alone or in combination with at least one of other embodiments.

Figure 2:
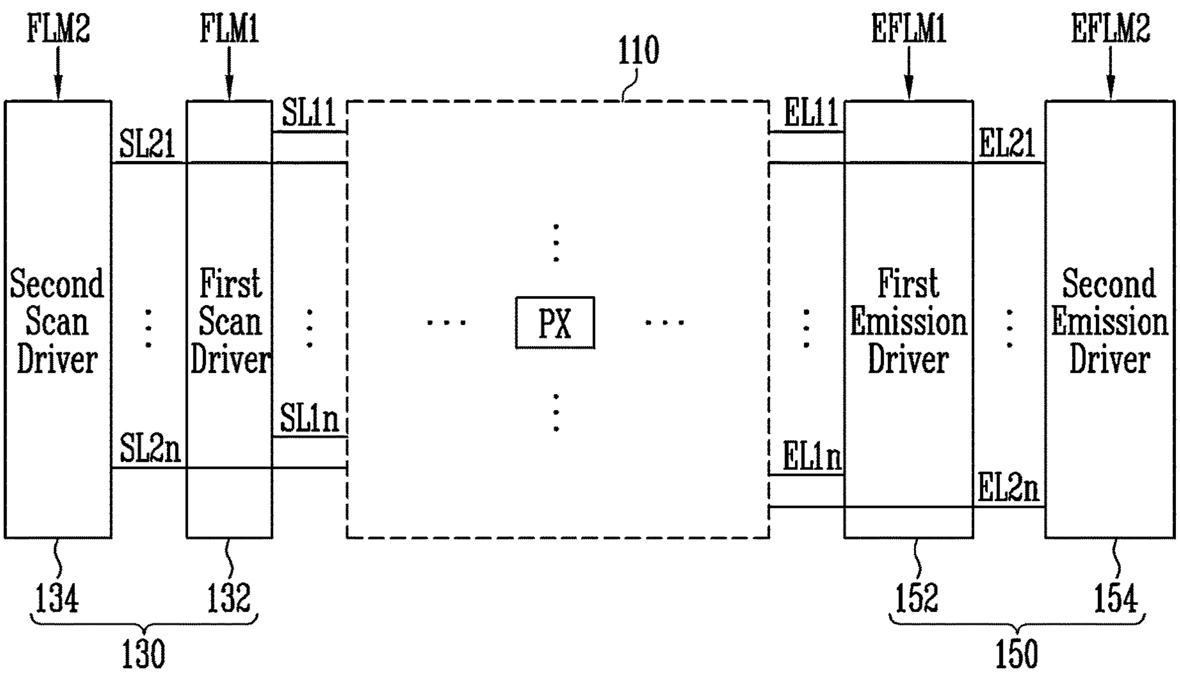
FIG. 2 is a diagram illustrating an embodiment of a scan driver and an emission driver shown in FIG. 1.

FIG. 1 is a diagram illustrating a display device according to an embodiment of the present inventive concept. FIG. 2 is a diagram illustrating an embodiment of a scan driver and an emission driver shown in FIG. 1.

Referring to FIG. 1, a display device 100 according to an embodiment of the present inventive concept may include a pixel unit 110 (or display panel), a timing controller 120, a scan driver 130, a data driver 140, an emission driver 150, and a power supply unit 160. The above-described components may be implemented as separate integrated circuits, and two or more of the above-described components may be integrated and implemented as one integrated circuit. Also, the scan driver 130 and the emission driver 150 may be formed in the pixel unit 110.

The pixel unit 110 may include pixels PX connected to first scan lines SL11, SL12, . . . , and SL1*n*, second scan lines SL21, SL22, . . . , and SL2*n*, first emission control lines EL11, EL12, . . . , and EL1*n*, second emission control lines EL21, EL22, . . . , and EL2*n*, data lines DL1, DL2, . . . , and DLm, and power source lines PL1 and PL2, where n and m may be natural numbers.

As an example, a pixel PXij (see FIG. 3) located on an i-th horizontal line (or pixel row) and a j-th vertical line (or pixel column) may be connected to an i-th first scan line SL1*i*, an i-th second scan line SL2*i*, an i-th first emission control line EL1*i*, an i-th second emission control line EL2*i*, and a j-th data line DLj, where i may be a natural number less than or equal to n, and j may be a natural number less than or equal to m.

When an enable first scan signal is supplied to one first scan line among the first scan lines SL11 to SL1*n*, pixels PX connected to the one first scan line (for example, one horizontal line or one pixel row) may be selected. The pixels PX selected by the one first scan signal may receive a data signal from data lines (DL1 to DLm) connected to the pixels PX, respectively. The pixels PX that receive the data signal may generate light with a predetermined luminance in response to a voltage of the data signal.

The scan driver 130 may receive a scan driving signal SCS from the timing controller 120. The scan driving signal SCS may include at least one scan start signal and clock signals necessary for driving the scan driver 130. The scan driver 130 may generate the enable first scan signal and an enable second scan signal by shifting the scan start signal in response to a clock signal.

To this end, the scan driver 130 may include a first scan driver 132 and a second scan driver 134 as shown in FIG. 2.

The first scan driver 132 may receive a first scan start signal FLM1 and generate the first scan signals by shifting the first scan start signal FLM1 in response to the clock signal. The first scan driver 132 may sequentially supply the first scan signals to the first scan lines SL11 to SL1*n*. The first scan driver 132 may supply a disable first scan signal to each of the first scan lines SL11 to SL1*n* when the enable first scan signal is not supplied.

The second scan driver 134 may receive a second scan start signal FLM2 and generate the second scan signals by shifting the second scan start signal FLM2 in response to the clock signal. The second scan driver 134 may sequentially supply the second scan signals to the second scan lines SL21 to SL2*n*. The second scan driver 134 may supply a disable second scan signal to each of the second scan lines SL21 to SL2*n* when the enable second scan signal is not supplied.

The enable first scan signal and the enable second scan signal may refer to a gate-on voltage at which transistors included in the pixels PX can be turned on. As an example, in a P-type transistor, the enable first scan signal and the enable second scan signal may be low-level voltages.

The disable first scan signal and the disable second scan signal may refer to a gate-off voltage at which transistors included in the pixels PX can be turned off. As an example, in a P-type transistor, the disable first scan signal and the disable second scan signal may be high-level voltages.

FIG. 2 shows the first scan driver 132 and the second scan driver 134 connected to first scan lines SL1 and second scan lines SL2, respectively. However, embodiments of the present inventive concept are not limited thereto. As an example, the first scan lines SL1 and the second scan lines SL2 may be driven by one scan driver.

The emission driver 150 may receive an emission driving signal ECS from the timing controller 120. The emission driving signal ECS may include an emission start signal and clock signals necessary for driving the emission driver 150. The emission driver 150 may generate a first emission control signal and a second emission control signal by shifting the emission start signal in response to a clock signal. To this end, the emission driver 150 may include a first emission driver 152 and a second emission driver 154 as shown in FIG. 2.

The first emission driver 152 may receive a first emission start signal EFLM1 and generate the first emission control signals by shifting the first emission start signal EFLM1 in response to the clock signal. The first emission driver 152 may sequentially supply the first emission control signals to the first emission control lines EL11 to EL1*n*. The first emission driver 152 may supply an enable first emission control signal to each of the first emission control lines EL11 to EL1*n* when a disable first emission control signal is not supplied.

The second emission driver 154 may receive a second emission start signal EFLM2 and generate the second emission control signals by shifting the second emission start signal EFLM2 in response to the clock signal. The second emission driver 154 may sequentially supply the second emission control signals to the second emission control lines EL21 to EL2*n*. The second emission driver 154 may supply an enable second emission control signal to each of the second emission control lines EL21 to EL2*n* when the disable second emission control signal is not supplied.

FIG. 2 shows the first emission driver 152 and the second emission driver 154 connected to a first emission control line EL1 and a second emission control line EL2, respectively, but embodiments of the present inventive concept are not limited thereto. As an example, the first emission control lines EL1 and the second emission control lines EL2 may be driven by one emission driver.

The disable first emission control signal and the disable second emission control signal may refer to a gate-off voltage at which transistors included in the pixels PX can be turned off. As an example, in a P-type transistor, the disable emission control signal may be a high-level voltage.

The enable first emission control signal and the enable second emission control signal may refer to a gate-on voltage at which transistors included in the pixels PX can be turned on. As an example, in a P-type transistor, the enable emission control signal may be a low-level voltage.

Figure 4:
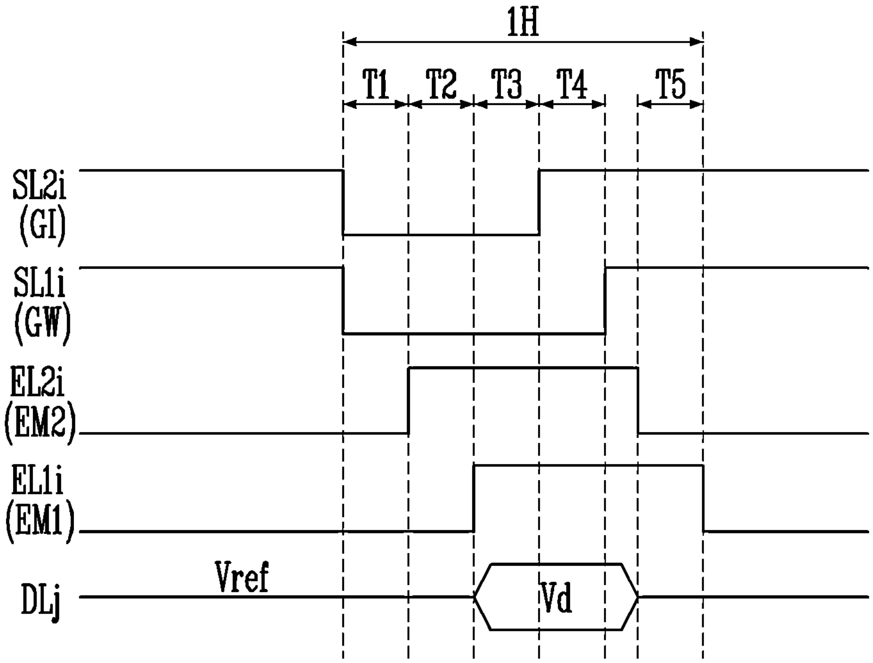
FIG. 4 is a waveform diagram illustrating an embodiment of a method for driving the pixel shown in FIG. 3.

The data driver 140 may receive output data Dout and a data driving signal DCS from the timing controller 120. The data driving signal DCS may include sampling signals and/or timing signals necessary for driving the data driver 140. The data driver 140 may generate data signals based on the data driving signal DCS and the output data Dout. As an example, the data driver 140 may generate analog data signals based on the grayscale of the output data Dout. As shown in FIG. 4, the data driver 140 may sequentially supply a voltage of a reference power source Vref and voltages Vd corresponding to the data signals to the data lines DL1 to DLm during one horizontal period 1H.

The timing controller 120 may receive input data Din and a control signal CS from a host system through an interface. As an example, the timing controller 120 may receive the input data Din and the control signal CS from at least one of a graphics processing unit (GPU), a central processing unit (CPU), and an application processor (AP) included in the host system. The control signal CS may include various signals including a clock signal.

The timing controller 120 may generate the scan driving signal SCS, the data driving signal DCS, and the emission driving signal ECS based on the control signal CS. The scan driving signal SCS, the data driving signal DCS, and the emission driving signal ECS may be supplied to the scan driver 130, the data driver 140, and the emission driver 150, respectively.

The timing controller 120 may rearrange the input data Din to match the specifications of the display device 100. In addition, the timing controller 120 may correct the input data Din to generate the output data Dout and supply the output data Dout to the data driver 140. In an embodiment, the timing controller 120 may correct the input data Din in response to an optical measurement result measured during a process.

The power supply unit 160 may generate various power sources necessary for driving the display device 100. As an example, the power supply unit 160 may generate a first driving power source VDD and the second driving power source VSS.

The first driving power source VDD may be a power source that supplies driving current to the pixels PX. The second driving power source VSS may be a power source that receives driving current from the pixels PX. During a period in which the pixels PX are set to emit light, the first driving power source VDD may be set to a higher voltage than the second driving power source VSS.

The first driving power source VDD generated in the power supply unit 160 may be supplied to a first power source line PL1, and the second driving power source VSS generated in the power supply unit 160 may be supplied to a second power source line PL2. The first power source line PL1 and the second power source line PL2 may be commonly connected to the pixels PX, but embodiments of the present inventive concept are not limited thereto.

In an embodiment, the first power source line PL1 may include a plurality of power source lines, and the plurality of power source lines may be connected to different pixels PX. In an embodiment, the second power source line PL2 may include a plurality of power source lines, and the plurality of power source lines may be connected to different pixels PX. That is, in an embodiment of the present inventive concept, the pixels PX may be connected to one of the first power source lines PL1 and one of second power source lines PL2.

Figure 3:
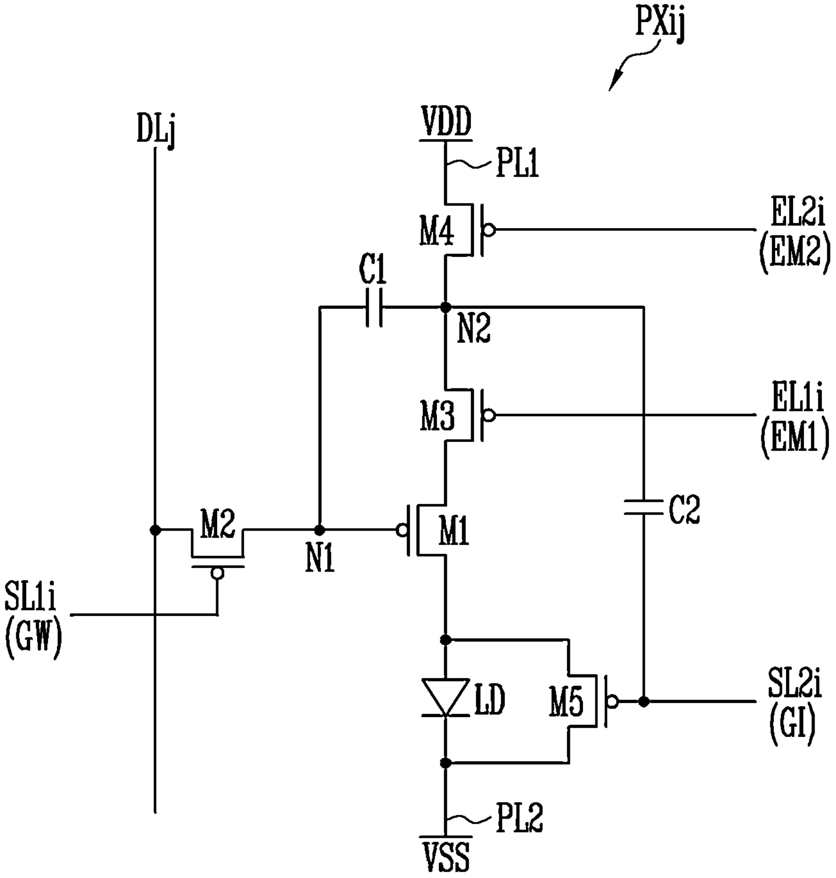
FIG. 3 is a diagram illustrating a pixel according to an embodiment of the present inventive concept.

FIG. 3 is a diagram illustrating a pixel according to an embodiment of the present inventive concept. FIG. 3 shows a pixel located on the i-th horizontal line and the j-th vertical line.

Referring to FIG. 3, the pixel PXij according to an embodiment of the present inventive concept may be connected to corresponding signal lines SL1*i*, SL2*i*, EL1*i*, EL2*i*, and DLj. For example, the pixel PXij may be connected to the i-th first scan line SL1*i*, the i-th second scan line SL2*i*, the i-th first emission control line EL1*i*, the i-th second emission control line EL2*i*, and the j-th data line DLj. In an embodiment, the pixel PXij may be further connected to the first power source line PL1 and the second power source line PL2.

The pixel PXij according to an embodiment of the present inventive concept may include a light emitting element LD and a pixel circuit for controlling the amount of current supplied to the light emitting element LD.

The light emitting element LD may be connected between the first power source line PL1 and the second power source line PL2.

As an example, a first electrode (or anode electrode) of the light emitting element LD may be electrically connected to the first power source line PL1 via a first transistor M1, a third transistor M3, a second node N2, and a fourth transistor M4, and a second electrode (or cathode electrode) of the light emitting element LD may be electrically connected to the second power source line PL2. The light emitting element LD may generate light with a predetermined luminance in response to amount of current supplied from the first power source line PL1 to the second power source line PL2 via the pixel circuit.

The light emitting element LD may be an organic light emitting diode. Also, the light emitting element LD may be an inorganic light emitting diode such as a micro LED (light emitting diode) or a quantum dot light emitting diode. In addition, the light emitting element LD may be an element that includes a combination of organic and inorganic materials. In FIG. 3, the pixel PXij includes a single light emitting element LD. However, in another embodiment, the pixel PXij may include a plurality of light emitting elements LD, and the plurality of light emitting elements LD may be connected to each other in series, in parallel, or in series and parallel.

The pixel circuit may include the first transistor M1, a second transistor M2, the third transistor M3, the fourth transistor M4, a fifth transistor M5, a first capacitor C1, and a second capacitor C2.

In an embodiment, the first transistor M1 to the fifth transistor M5 may be P-type transistors. However, this is only an example, and at least one of the first transistor M1 to the fifth transistor M5 may be an N-type transistor.

A first electrode of the first transistor M1 (or driving transistor) may be connected to a second electrode of the third transistor M3, and a second electrode of the first transistor M1 may be connected to the first electrode of the light emitting element LD. Here, the expression "connected" may include the meaning of being electrically connected. A gate electrode of the first transistor M1 may be connected to a first node N1. The first transistor M1 may control the amount of current supplied from the first driving power source VDD to the second driving power source VSS via the light emitting element LD in response to a voltage of the first node N1.

The second transistor M2 may be connected between a data line DLj and the first node N1. Additionally, a gate electrode of the second transistor M2 may be electrically connected to a first scan line SL1*i*. The second transistor M2 may be turned on when an enable first scan signal GW is supplied to the first scan line SL1*i* to electrically connect the data line DLj and the first node N1.

A first electrode of the third transistor M3 may be connected to a second node N2, and the second electrode of the third transistor M3 may be connected to the first electrode of the first transistor M1. Additionally, a gate electrode of the third transistor M3 may be electrically connected to a first emission control line EL1*i*. The third transistor M3 may be turned off when a disable first emission control signal EM1 is supplied to the first emission control line EL1*i* to block electrical connection between the second node N2 and the first transistor M1.

The fourth transistor M4 may be connected between the first power source line PL1 and the second node N2. Additionally, a gate electrode of the fourth transistor M4 may be electrically connected to the second emission control line EL2*i*. The fourth transistor M4 may be turned off when a disable second emission control signal EM2 is supplied to the second emission control line EL2*i* to block electrical connection between the first power source line PL1 and the second node N2.

The fifth transistor M5 may be connected between the first electrode of the light emitting element LD and the second power source line PL2 (or the second electrode of the light emitting element LD). Additionally, a gate electrode of the fifth transistor M5 may be electrically connected to a second scan line SL2*i*. The fifth transistor M5 may be turned on when an enable second scan signal GI is supplied to the second scan line SL2*i* to electrically connect the first electrode of the light emitting element LD and the second power source line PL2.

The first capacitor C1 may be connected between the first node N1 and the second node N2. The first capacitor C1 may store a voltage between the first node N1 and the second node N2. Additionally, the first capacitor C1 may be driven as a coupling capacitor and may transmit the amount of change in voltage at the first node N1 to the second node N2, or transmit the amount of change in voltage at the second node N2 to the first node N1.

The second capacitor C2 may be connected between the second node N2 and the second scan line SL2*i*. The second capacitor C2 may be driven as a coupling capacitor and may transmit the amount of change in voltage in the second scan line SL2*i* to the second node N2.

As described above, the pixel PXij according to the embodiment of the present inventive concept may include five transistors M1 to M5 and two capacitors C1 and C2. In addition, the pixel PXij according to the embodiment of the present inventive concept may be connected to two power source lines PL1 and PL2. Generally, conventional pixels are connected to three or more power source lines and six or more transistors. The pixel PXij according to the embodiment of the present inventive concept may be applied to a high-resolution display panel because an area occupied by power source lines and transistors can be minimized.

FIG. 4 is a waveform diagram illustrating an embodiment of a method for driving the pixel shown in FIG. 3.

Referring to FIG. 4, a horizontal period 1H (or a specific horizontal period) in which the data signal is supplied to the pixel PXij located on the i-th horizontal line and the j-th vertical line may include a first period T1, a second period T2, a third period T3, a fourth period T4, and a fifth period T5.

The data driver 140 may supply the voltage of the reference power source Vref to the data line DLj during the first period T1 and the second period T2, and supply the voltage Vd of the data signal to the data line DLj during the third period T3 and the fourth period T4. Here, the data driver 140 may supply the voltage Vd of the data signal to the data line DLj even during the fifth period T5. The reference power source Vref may be set to a voltage (or constant voltage) at which the first transistor M1 can be turned on when the reference power source Vref is supplied to the first node N1. As an example, the reference power source Vref may be set to a lower voltage than the first driving power source VDD. The voltage Vd of the data signal may be set to a voltage corresponding to a grayscale of the pixel PXij.

The scan driver 130 (or the first scan driver 132) may supply the enable first scan signal GW to the first scan line SL1*i* during the first period T1 to the fourth period T4. The scan driver 130 (or the second scan driver 134) may supply the enable second scan signal GI to the second scan line SL2*i* during the first period T1 to the third period T3.

The emission driver 150 (or the first emission driver 152) may supply the disable first emission control signal EM1 to the first emission control line EL1*i* during the third period T3 to the fifth period T5. The emission driver 150 (or the second emission driver 154) may supply the disable second emission control signal EM2 to the second emission control line EL2*i* during the second period T2 to the fourth period T4.

The first period T1 may be a period in which the gate electrode of the first transistor M1 is initialized to a voltage of the reference power source Vref. The second period T2 may be a period in which a threshold voltage of the first transistor M1 is compensated. The third period T3 and the fourth period T4 may be periods in which the voltage Vd of the data signal is supplied to the pixel PXij. The fifth period T5 may be a period in which the voltage Vd of the data signal and a voltage corresponding to the threshold voltage of the first transistor M1 are supplied to the first node N1. The light emitting element LD may be initialized during the first period T1 to the third period T3.

FIGS. 5A to 5F are diagrams illustrating an embodiment of an operation process of the pixel corresponding to driving waveforms of FIG. 4.

Figure 5A:
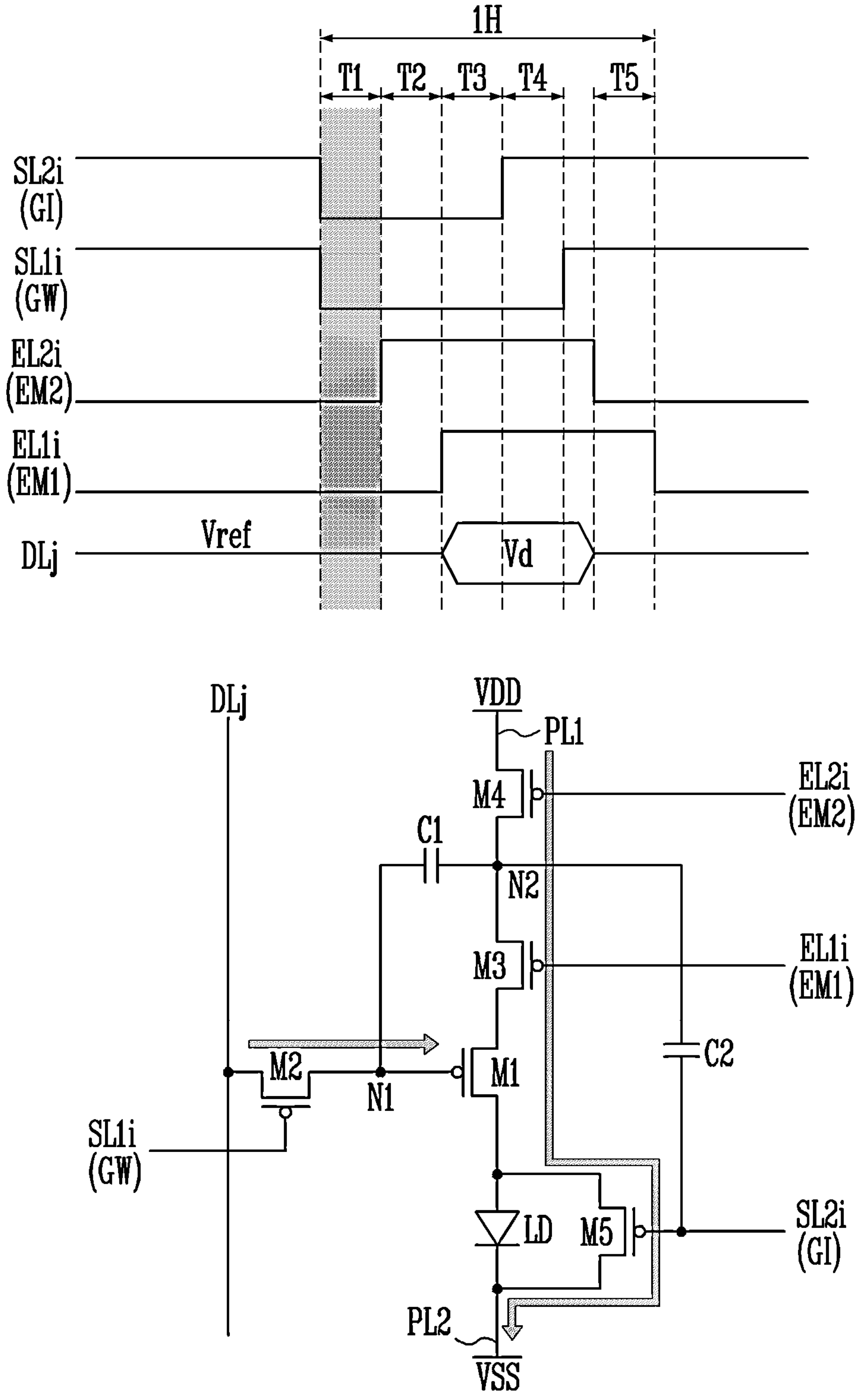
FIGS. 5A, 5B, 5C, 5D, 5E and 5F are diagrams illustrating an embodiment of an operation process of the pixel corresponding to driving waveforms of FIG. 4.

Referring to FIG. 5A, during the first period T1, the enable first scan signal GW may be supplied to the first scan line SL1*i*, and the enable second scan signal GI may be supplied to the second scan line SL2*i*. Also, during the first period T1, the enable first emission control signal EM1 may be supplied to the first emission control line EL1*i*, and the enable second emission control signal EM2 may be supplied to the second emission control line EL2*i*. In addition, during the first period T1, the voltage of the reference power source Vref may be supplied to the data line DLj.

When the enable first scan signal GW is supplied to the first scan line SL1*i*, the second transistor M2 may be turned on. When the second transistor M2 is turned on, the voltage of the reference power source Vref may be supplied from the data line DLj to the first node N1. Accordingly, the first node N1 may be initialized to the voltage of the reference power source Vref. Here, the reference power source Vref may be set to a voltage at which the first transistor M1 can be turned on. Accordingly, the first transistor M1 may be set to a turned-on state.

When the enable second scan signal GI is supplied to the second scan line SL2*i*, the fifth transistor M5 may be turned on. When the fifth transistor M5 is turned on, the voltage of the second driving power source VSS may be supplied to the first electrode of the light emitting element LD. When the voltage of the second driving power source VSS is supplied to the first electrode of the light emitting element LD, a parasitic capacitor of the light emitting element LD may be discharged. As the current voltage charged in the parasitic capacitor of the light emitting element LD is discharged (or removed), unintended weak light emitting can be prevented. Accordingly, black expression ability of the pixel PXij can be improved.

When the enable first emission control signal EM1 is supplied to the first emission control line EL1*i*, the third transistor M3 may be turned on. Accordingly, the second node N2 and the first electrode of the first transistor M1 may be electrically connected to each other. When the enable second emission control signal EM2 is supplied to the second emission control line EL2*i*, the fourth transistor M4 may be turned on. Accordingly, the first power source line PL1 and the second node N2 may be electrically connected to each other.

During the first period T1, current supplied from the first power source line PL1 may be supplied to the second power source line PL2 via the fourth transistor M4, the third transistor M3, the first transistor M1, and the fifth transistor M5. Accordingly, during the first period T1, the light emitting element LD does not emit light.

Figure 5B:
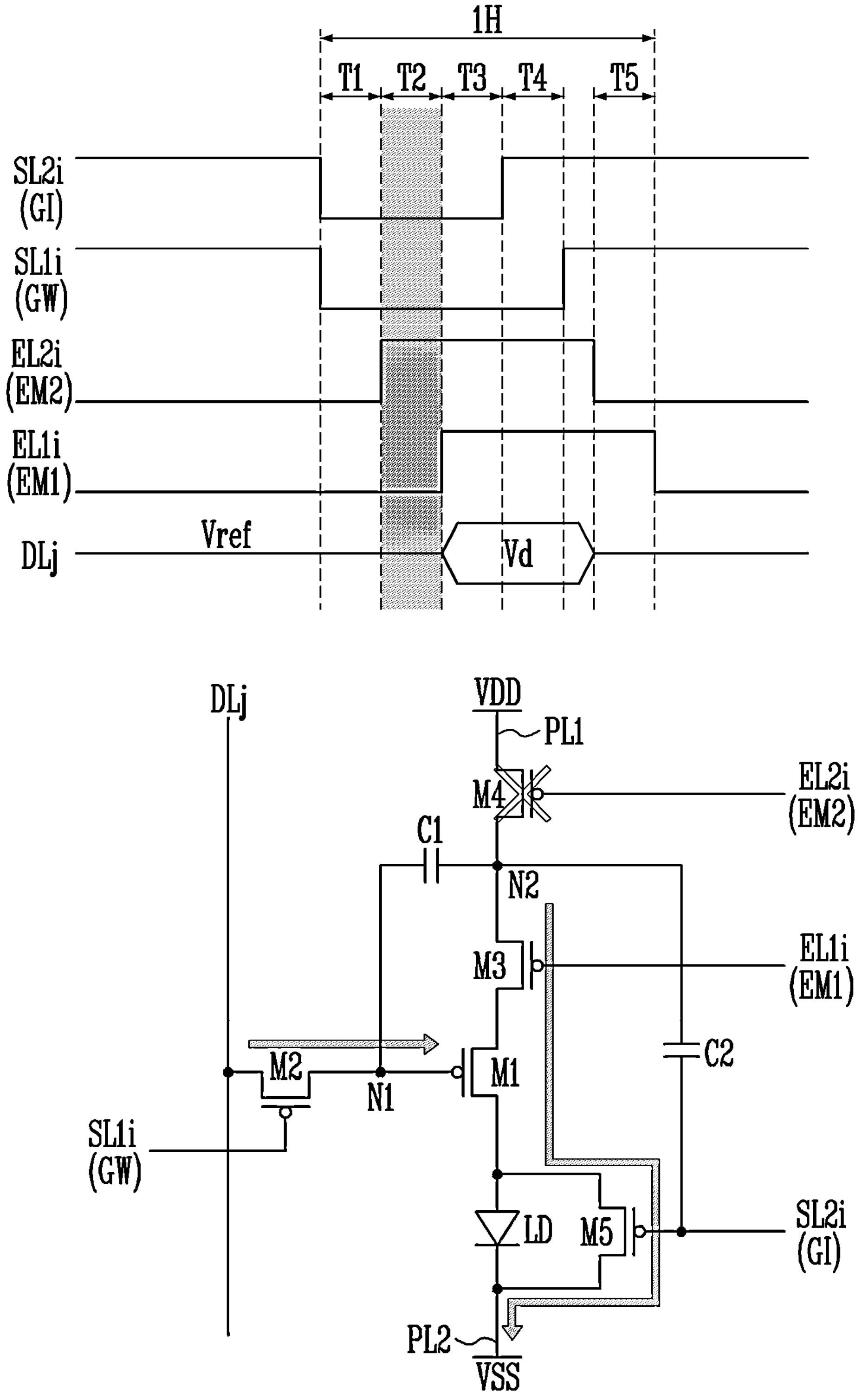

Referring to FIG. 5B, during the second period T2, the disable second emission control signal EM2 may be supplied to the second emission control line EL2*i*. In addition, during the second period T2, supply of the enable first scan signal GW, the enable second scan signal GI, and the enable first emission control signal EM1 may be maintained.

When the disable second emission control signal EM2 is supplied to the second emission control line EL2*i*, the fourth transistor M4 may be turned off. In this case, the first node N1 may maintain the voltage of the reference power source Vref.

When the fourth transistor M4 is turned off, a voltage of the second node N2 may be reduced to a voltage obtained by adding an absolute value of the threshold voltage of the first transistor M1 to the voltage of the reference power source Vref from the first driving power source VDD. Here, when the threshold voltage of the first transistor M1 has a negative polarity voltage (for example, −2V), the voltage of the second node N2 may be expressed as Vref-Vth (if Vref is −5V, Vref−Vth=−3V). In the following description, it is assumed that the threshold voltage of the first transistor M1 has a negative polarity voltage.

During the second period T2, the first node N1 may maintain the voltage of the reference power source Vref, and the second node N2 may be set to a voltage obtained by subtracting the threshold voltage of the first transistor M1 from the voltage of the reference power source Vref. Accordingly, during the second period T2, the voltage corresponding to the threshold voltage of the first transistor M1 may be stored in the first capacitor C1.

Figure 5C:
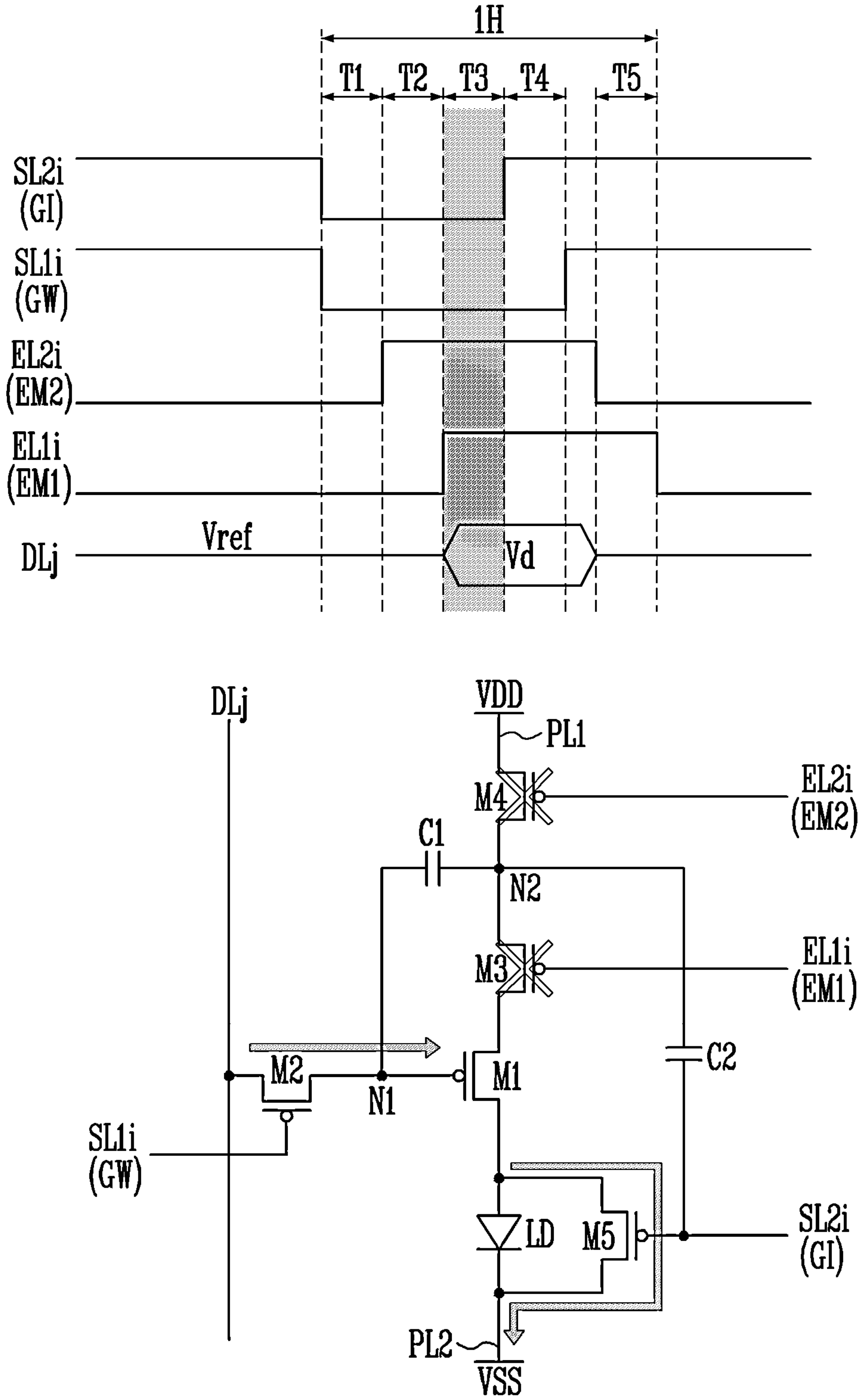

Referring to FIG. 5C, during the third period T3, the disable first emission control signal EM1 may be supplied to the first emission control line EL1*i*, and the voltage of the data signal Vd may be supplied to the data line DLj. In addition, during the third period T3, supply of the enable first scan signal GW, the enable second scan signal GI, and the disable second emission control signal EM2 may be maintained.

When the disable first emission control signal EM1 is supplied to the first emission control line EL1*i*, the third transistor M3 may be turned off. When the third transistor M3 is turned off, electrical connection between the first electrode of the first transistor M1 and the second node N2 may be blocked, and thus the second node N2 may be set to a floating state.

During the third period T3, the voltage Vd of the data signal supplied to the data line DLj may be supplied to the first node N1 via the second transistor M2. In this case, the voltage of the first node N1 may be changed from the voltage of the reference power source Vref to the voltage Vd of the data signal. In this case, the voltage of the second node N2 may also be changed by coupling of the first capacitor C1.

In an embodiment, the amount of change in voltage at the second node N2 may be determined in accordance with the ratio of the first capacitor C1 and the second capacitor C2. As change in voltage at the first node N1 by C1/(C1+C2).

$$V(N2a) = Vref - Vth + (Vd - Vref) \times C1/(C1 + C2) \quad \text{[Equation 1]}$$

In Equation 1, V(N2*a*) may mean the voltage of the second node N2 during the third period T3, (Vd−Vref) may mean the amount of change in voltage at the first node N1, and Vth may mean the threshold voltage of the first transistor M1.

Figure 5D:
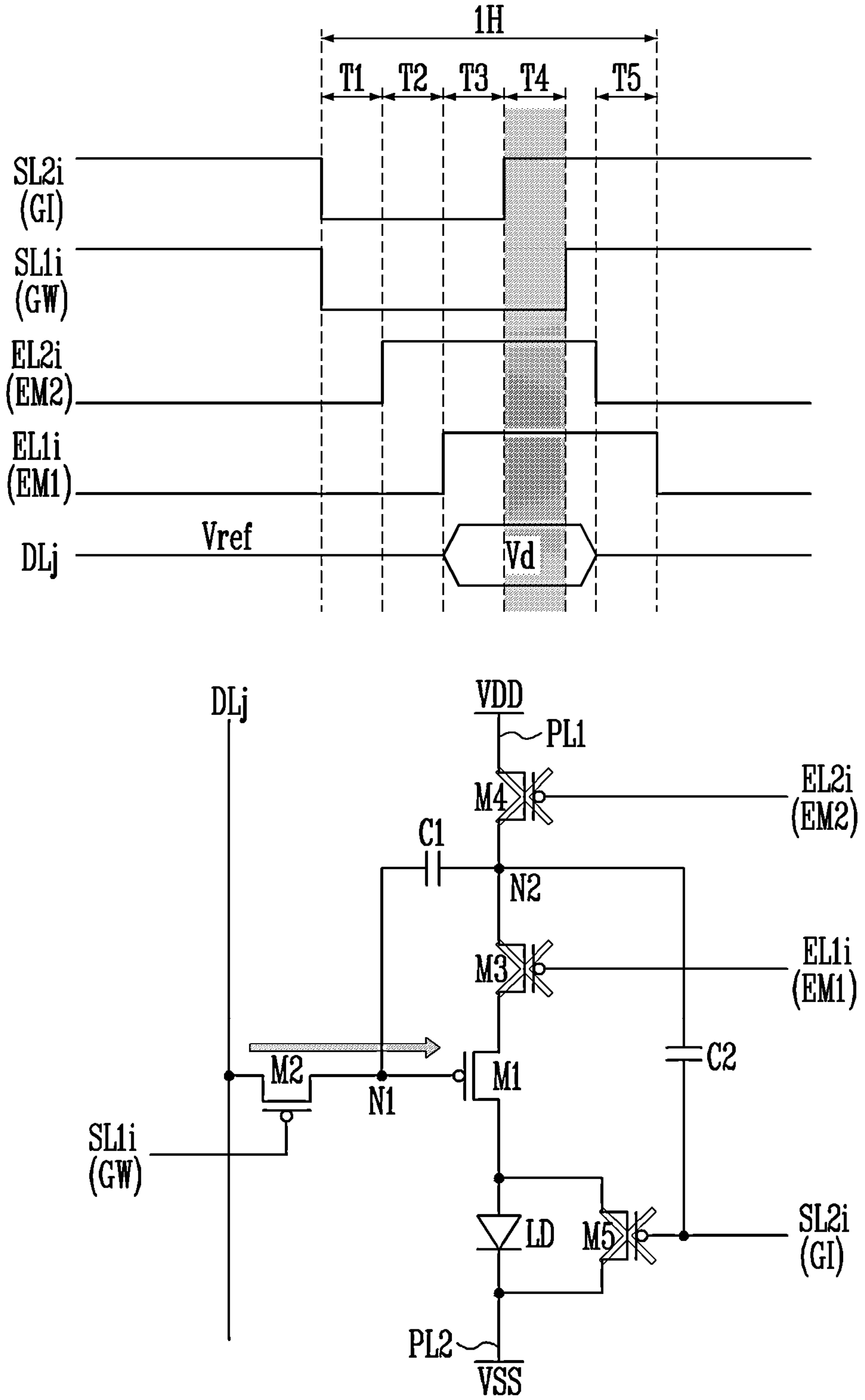

Referring to FIG. 5D, during the fourth period T4, the disable second scan signal GI may be supplied to the second scan line SL2*i*. Also, during the fourth period T4, supply of the enable first scan signal GW, the disable first emission control signal EM1, and the disable second emission control signal EM2 may be maintained. In addition, during the fourth period T4, the voltage of the data signal Vd may be supplied to the data line DLj.

When the disable second scan signal GI is supplied to the second scan line SL2*i*, the fifth transistor M5 may be turned off. When the fifth transistor M5 is turned off, electrical connection between the second power source line PL2 and the first electrode of the light emitting element LD may be blocked. In this case, because the fourth transistor M4 and the third transistor M3 are maintained in a turned-off state, the light emitting element LD may not emit light.

Meanwhile, during the fourth period T4, a voltage of the second scan line SL2*i* may be changed from a voltage of the enable second scan signal GI (for example, a low voltage) to a voltage of the disable second scan signal GI (for example, a high voltage). In this case, the voltage of the second node N2 may also be increased (or boosted) by coupling of the second capacitor C2. As an example, the voltage of the second node N2 may be increased by a value obtained by multiplying the amount of change in voltage in the second scan line SL2*i* by C2/(C1+C2). This may be expressed as Equation 2 below.

$$V(N2b) = Vref - Vth + (Vd - Vref) \times C1/(C1 + C2) + (Vgh - Vgl) \times C2/(C1 + C2) \quad \text{[Equation 2]}$$

In Equation 2, V(N2*b*) may mean the voltage of the second node N2 during the fourth period T4, Vgh may mean the voltage of the disable second scan signal GI, and Vgl may mean the voltage of the enable second scan signal GI.

Figure 5E:
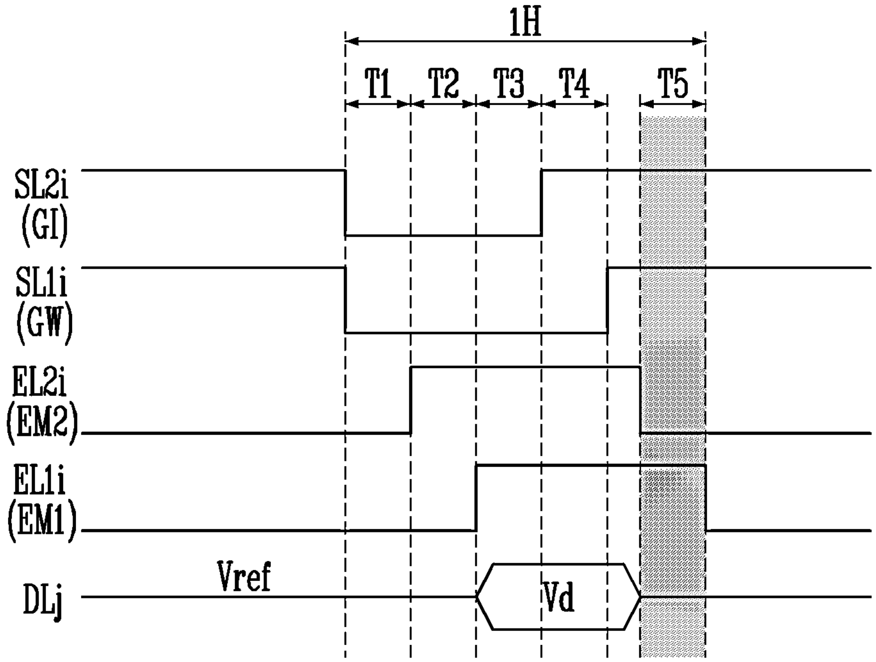
Figure 5E:
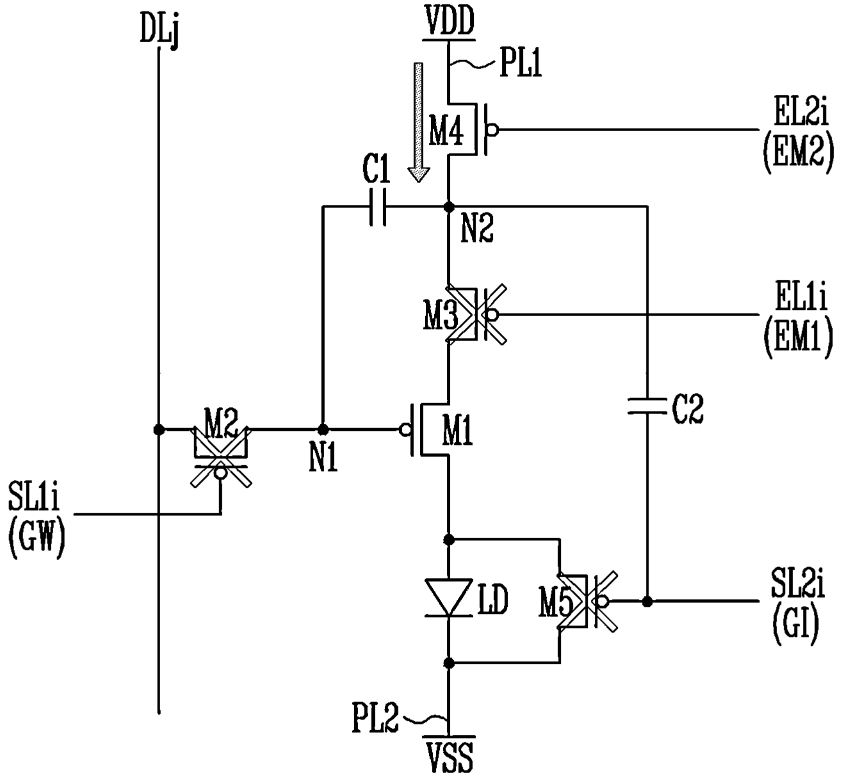

Referring to FIG. 5E, during the fifth period T5, the disable first scan signal GW may be supplied to the first scan line SL1*i* and the enable second emission control signal EM2 may be supplied to the second emission control line EL2*i*. In addition, during the fifth period T5, supply of the disable second scan signal GI and the disable first emission control signal EM1 may be maintained.

When the disable first scan signal GW is supplied to the first scan line SL1*i*, the second transistor M2 may be turned off. When the second transistor M2 is turned off, the first node N1 may be set to a floating state.

When the enable second emission control signal EM2 is supplied to the second emission control line EL2*i*, the fourth transistor M4 may be turned on. When the fourth transistor M4 is turned on, a voltage of the first driving power source VDD may be supplied to the second node N2. In this case, the voltage of the second node N2 may be changed from a voltage of Equation 2 to the voltage of the first driving power source VDD.

In addition, by coupling of the first capacitor C1, the voltage of the first node N1 may be changed from the voltage Vd of the data signal to a voltage corresponding to the amount of change in voltage at the second node N2. As an example, the voltage of the first node N1 may be expressed as Equation 3 below.

$$V(N1) = Vd + VDD - \left(Vref - Vth + (Vd - Vref) \times C1/(C1 + C2) + (Vgh - Vgl) \times C2/(C1 + C2)\right) \quad \text{[Equation 3]}$$

In Equation 3, V(N1) may mean the voltage of the first node N1. The first driving power source VDD and the reference power source Vref may be maintained at a constant voltage. Accordingly, the voltage of the first node N1 may be determined by the threshold voltage of the first transistor M1 and the voltage Vd of the data signal.

Figure 5F:
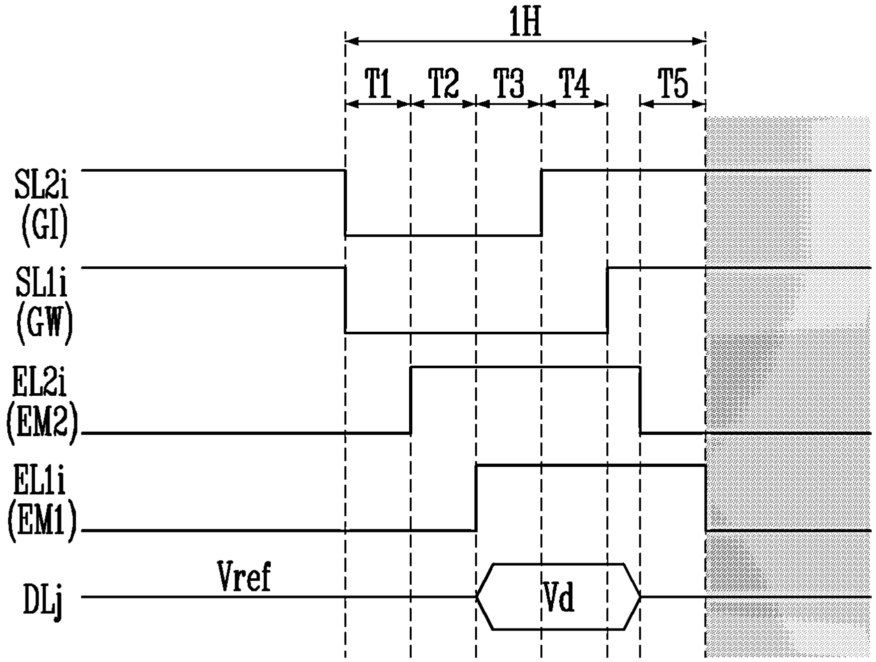
Figure 5F:
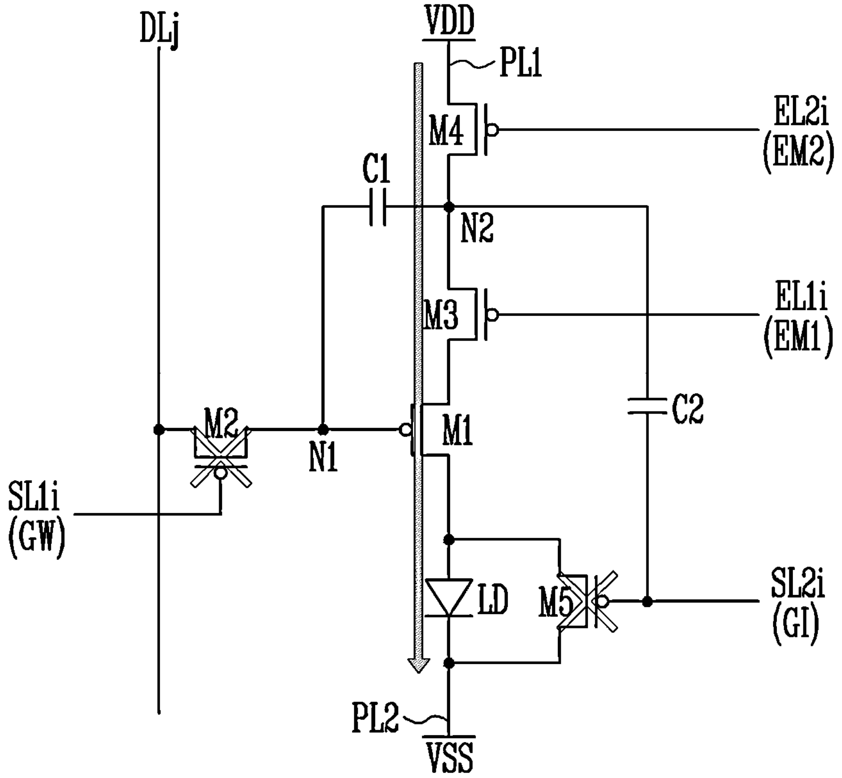

Referring to FIG. 5F, after the fifth period T5, the enable first emission control signal EM1 may be supplied to the first emission control line EL1*i*. In addition, after the fifth period T5, supply of the disable first scan signal GW, the disable second scan signal GI, and the enable second emission control signal EM2 may be maintained.

Then, during a period after the fifth period T5, the second transistor M2 and the fifth transistor M5 may be turned off, and the third transistor M3 and the fourth transistor M4 may be turned on. In this case, the first transistor M1 may control the amount of current supplied from the first power source line PL1 to the second power source line PL2 via the light emitting element LD in response to the voltage of the first node N1. As shown in Equation 3, the first node N1 may have a voltage in which the threshold voltage of the first transistor M1 is already considered. Accordingly, current in which the threshold voltage of the first transistor M1 is compensated may be supplied to the light emitting element LD. During the period after the fifth period T5, the light emitting element LD may generate light with a predetermined luminance in response to the amount of current supplied from the first transistor M1.

Figure 6:
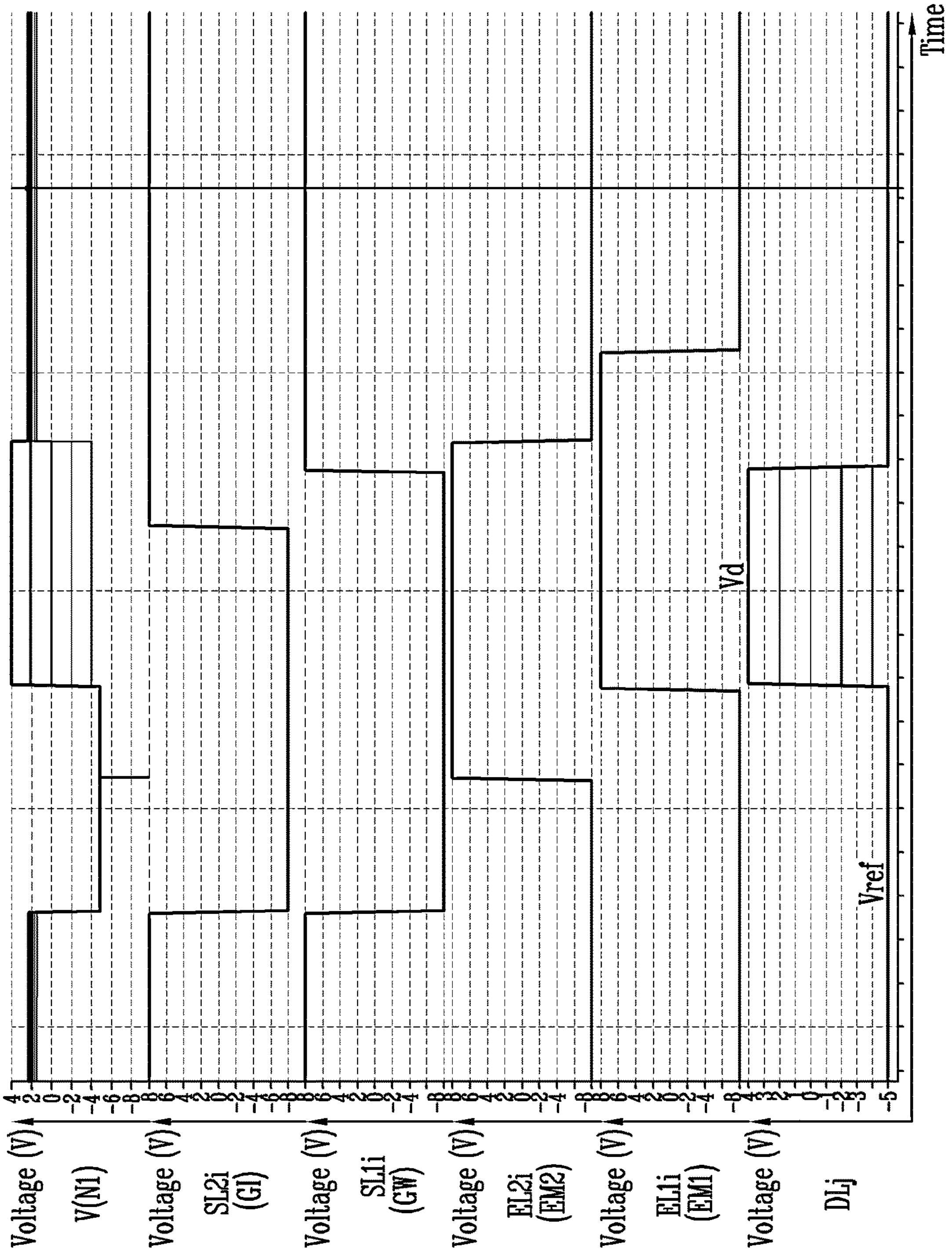
FIG. 6 is a diagram illustrating a simulation result of the pixel shown in FIG. 3.

FIG. 6 is a diagram illustrating a simulation result of the pixel shown in FIG. 3. In FIG. 6, the X-axis may mean time, and the Y-axis may mean voltage [V].

Referring to FIG. 6, when the voltage Vd of the data signal is supplied as –4V, −2V, 0V, 2V, and 4V, a voltage VN1 of the first node N1 may be changed in response to the voltage Vd of the data signal. That is, in an embodiment of the present inventive concept, the voltage VN1 of the first node N1 may be changed in response to a change in the voltage Vd of the data signal, and accordingly, light with a luminance corresponding to voltage Vd of the data signal may be generated in the pixel PXij.

Table 1 below shows a calculated voltage of the first node N1 (Calculated VG) and a simulated voltage of the first node N1 (Sim VG).

TABLE 1

| Vd | Calculated VG | Sim VG |
|---|---|---|
| –4 V | 1.5 | 1.55 |
| –2 V | 1.7 | 1.75 |
| 0 V | 1.9 | 1.95 |
| 2 V | 2.1 | 2.15 |
| 4 V | 2.3 | 2.35 |

In Table 1, it is assumed that a threshold voltage Vth of the first transistor M1 is −2V, a gate-on voltage supplied to the scan lines SL1, SL2, and SL3 and the emission control line EL is −8V, and a gate-off voltage is 8V. Also, it is assumed that the first capacitor C1 has a capacitance of 9α and the second capacitor C2 has a capacitance of 1α. Referring to Table 1, the voltage of the first node N1 calculated according to the voltage Vd of the data signal (that is, Calculated VG) may have a voltage difference of approximately 0.05V from the voltage of the first node N1 obtained through simulation (that is, Sim VG). That is, the pixels PX according to the embodiment of the present inventive concept can be driven as intended.

Figure 7:
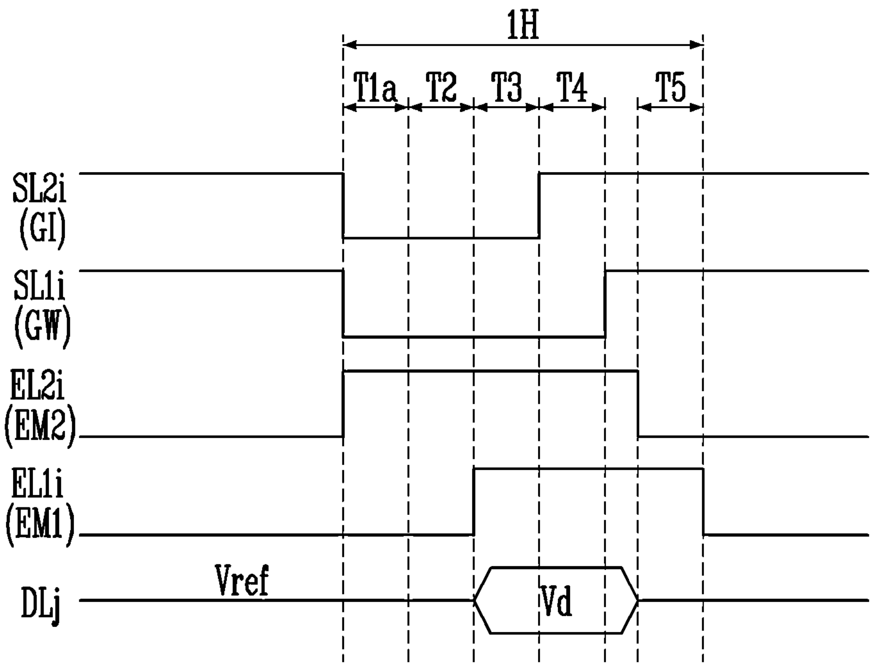
FIG. 7 is a waveform diagram illustrating an embodiment of a method for driving the pixel shown in FIG. 3.

FIG. 7 is a waveform diagram illustrating an embodiment of a method for driving the pixel shown in FIG. 3. When describing FIG. 7, descriptions of portions overlapping with FIGS. 4 to 5F will be omitted.

Referring to FIG. 7, during a first period T1*a* to a fourth period T4, the disable second emission control signal EM2 may be supplied to the second emission control line EL2*i*. Comparing the driving waveforms of FIG. 7 with the driving waveforms of FIG. 4, FIG. 7 may have a difference that the disable second emission control signal EM2 is supplied during the first period T1*a*.

During the first period T1*a*, when the disable second emission control signal EM2 is supplied, the fourth transistor M4 may be set to a turned-off state. Then, the threshold voltage of the first transistor M1 may be compensated during the first period T1*a*, similar to the second period T2 shown in FIG. 5B. That is, in the driving waveforms of FIG. 7, the threshold voltage of the first transistor M1 may be compensated for during the first period T1*a* and the second period T2.

Figure 8:
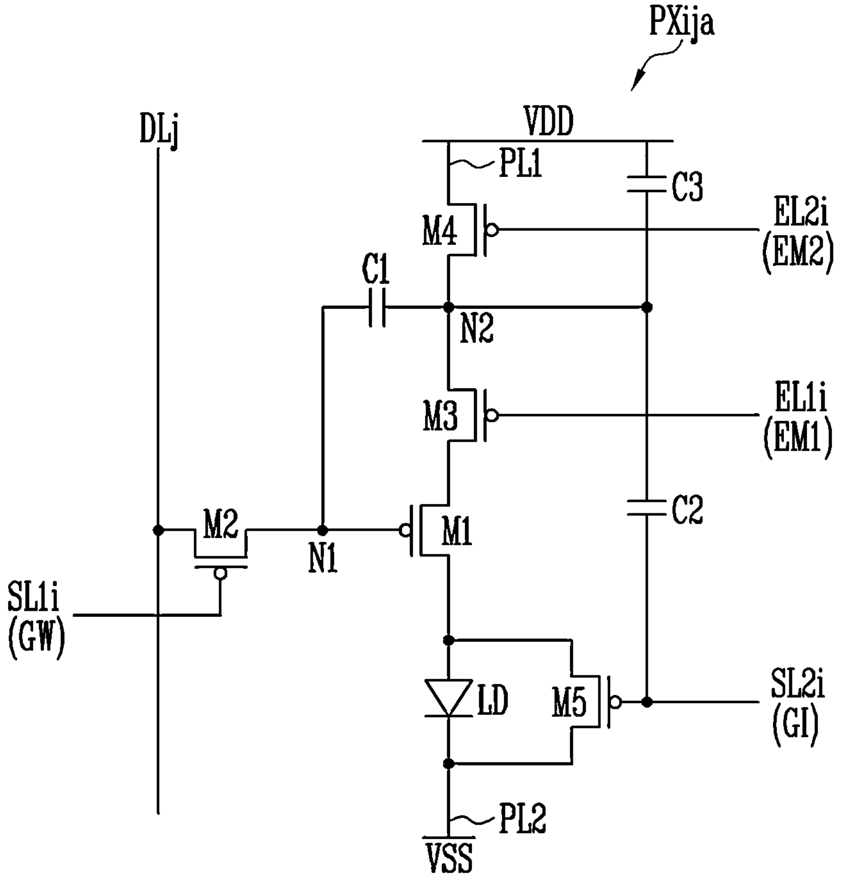
FIG. 8 is a diagram illustrating a pixel according to an embodiment of the present inventive concept.

FIG. 8 is a diagram illustrating a pixel according to an embodiment of the present inventive concept. FIG. 8 shows a pixel located on the i-th horizontal line and j-th vertical line. When describing FIG. 8, overlapping descriptions related to the same parts as those of FIG. 3 will be omitted.

Referring to FIG. 8, a pixel PXija according to an embodiment of the present inventive concept may be connected to corresponding signal lines SL1*i*, SL2*i*, EL1*i*, EL2*i*, and DLj.

The pixel PXija according to an embodiment of the present inventive concept may include a light emitting element LD and a pixel circuit for controlling the amount of current supplied to the light emitting element LD.

The light emitting element LD may be connected between the first power source line PL1 and the second power source line PL2. The light emitting element LD may generate light with a predetermined luminance in response to the amount of current supplied from the first power source line PL1 to the second power source line PL2 via the pixel circuit.

The pixel circuit may include a first transistor M1, a second transistor M2, a third transistor M3, a fourth transistor M4, a fifth transistor M5, a first capacitor C1, a second capacitor C2, and a third capacitor C3.

Comparing the pixel PXija shown in FIG. 8 with the pixel PXij shown in FIG. 3, the third capacitor C3 may be additionally provided in the pixel PXija shown in FIG. 8. In this case, during the fourth period T4, the voltage of the second node N2 may be increased by a voltage obtained by multiplying the amount of change in voltage in the second scan line SL2*i* by approximately C2/(C1+C2+C3). That is, when the third capacitor C3 is added, the amount of voltage increase at the second node N2 can be controlled.

Figure 9:
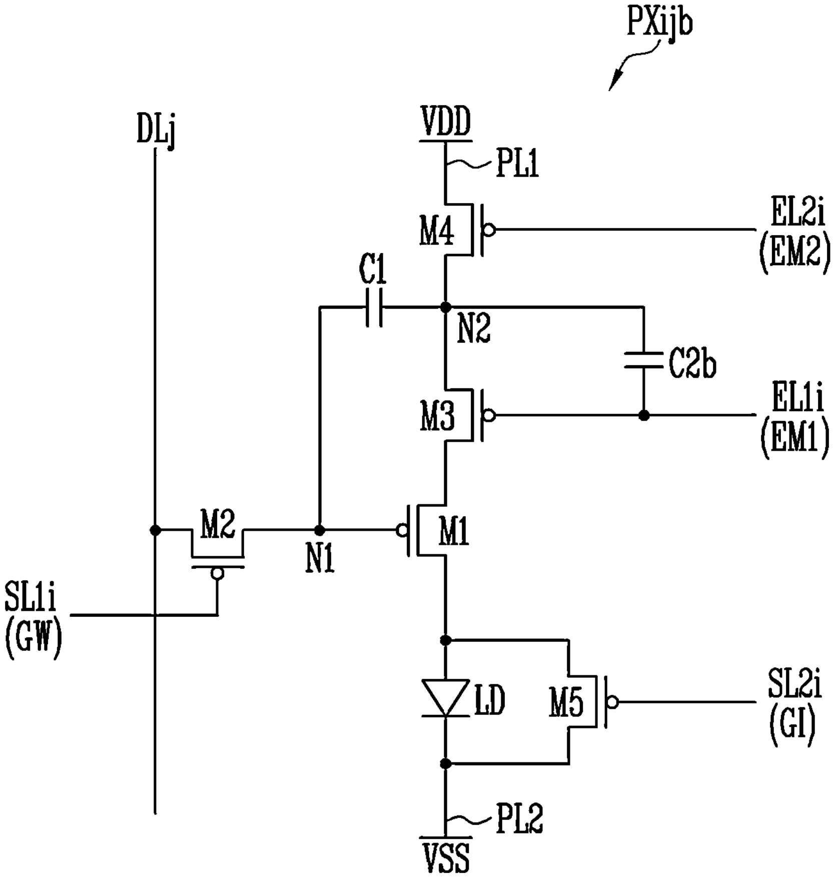
FIG. 9 is a diagram illustrating a pixel according to an embodiment of the present inventive concept.

FIG. 9 is a diagram illustrating a pixel according to an embodiment of the present inventive concept. FIG. 9 shows a pixel located on the i-th horizontal line and the j-th vertical line. When describing FIG. 9, overlapping descriptions related to the same parts as those of FIG. 3 will be omitted.

Referring to FIG. 9, a pixel PXijb according to an embodiment of the present inventive concept may be connected to corresponding signal lines SL1*i*, SL2*i*, EL1*i*, EL2*i*, and DLj.

The pixel PXijb according to an embodiment of the present inventive concept may include a light emitting element LD and a pixel circuit for controlling the amount of current supplied to the light emitting element LD.

The light emitting element LD may be connected between the first power source line PL1 and the second power source line PL2. The light emitting element LD may generate light with a predetermined luminance in response to the amount of current supplied from the first power source line PL1 to the second power source line PL2 via the pixel circuit.

The pixel circuit may include a first transistor M1, a second transistor M2, a third transistor M3, a fourth transistor M4, a fifth transistor M5, a first capacitor C1, and a second capacitor C2*b*. The second capacitor C2*b* may be connected between the second node N2 and the first emission control line EL1*i*.

An operation process is briefly described with reference to FIGS. 4 and 9 as follows. During the third period T3, the voltage of the second node N2 may be changed by the voltage Vd of the data signal supplied to the first node N1. In addition, during the third period T3, the voltage of the second node N2 may be changed by the disable first emission control signal EM1 supplied to the first emission control line EL1*i*. That is, in the pixel PXijb of FIG. 9, during the third period T3, the voltage of the second node N2 may be changed in response to the amount of change in voltage in the first emission control line EL1*i*.

After the fifth period T5, the enable first emission control signal EM1 may be supplied to the first emission control line EL1*i*. In this case, the second node N2 may maintain the voltage of the driving power source VDD. Accordingly, the amount of change in voltage in the first emission control line EL1*i* may not affect the voltage of the second node N2.

That is, in the pixel PXijb according to the embodiment of the present inventive concept, the voltage of the second node N2 may increase in response to the amount of change in voltage in the first emission control line EL1*i*, and the voltage and driving process of each node corresponding thereto may be the same as the pixel in FIG. 3.

Figure 10:
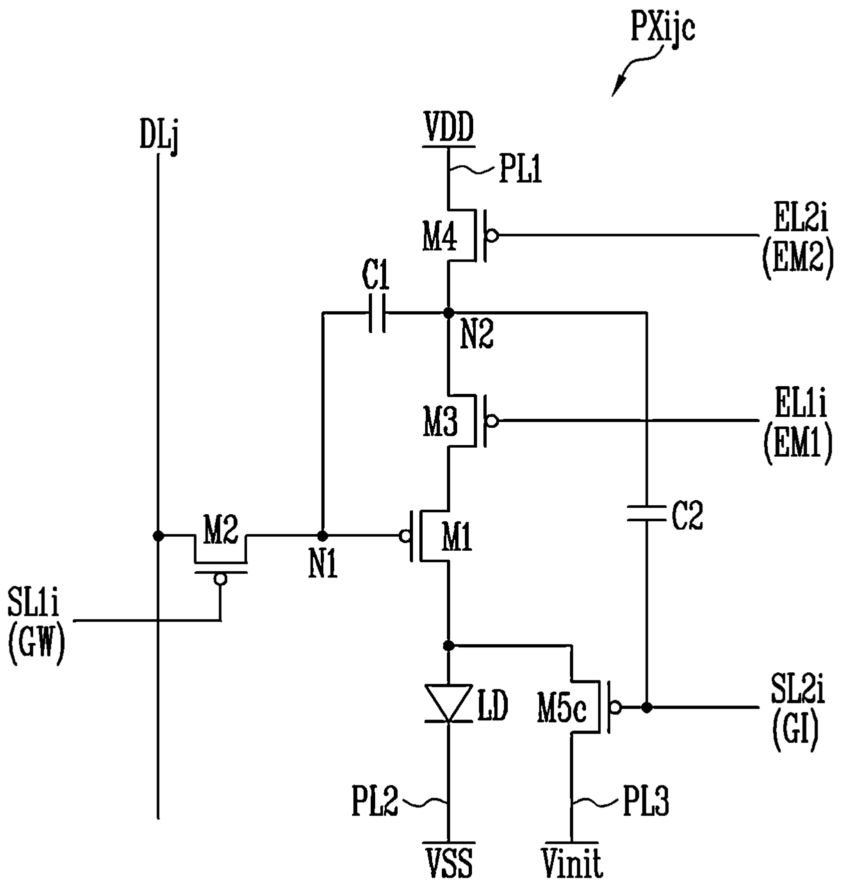
FIG. 10 is a diagram illustrating a pixel according to an embodiment of the present inventive concept.

FIG. 10 is a diagram illustrating a pixel according to an embodiment of the present inventive concept. FIG. 10 shows a pixel located on the i-th horizontal line and the j-th vertical line. When describing FIG. 10, overlapping descriptions related to the same parts as those of FIG. 3 will be omitted.

Referring to FIG. 10, a pixel PXijc according to an embodiment of the present inventive concept may be connected to corresponding signal lines SL1*i*, SL2*i*, EL1*i*, EL2*i*, and DLj.

The pixel PXijc according to an embodiment of the present inventive concept may include a light emitting element LD and a pixel circuit for controlling the amount of current supplied to the light emitting element LD.

The light emitting element LD may be connected between the first power source line PL1 and the second power source line PL2. The light emitting element LD may generate light with a predetermined luminance in response to the amount of current supplied from the first power source line PL1 to the second power source line PL2 via the pixel circuit.

The pixel circuit may include a first transistor M1, a second transistor M2, a third transistor M3, a fourth transistor M4, a fifth transistor M5*c*, a first capacitor C1, and a second capacitor C2.

The fifth transistor M5*c* may be connected between the first electrode of the light emitting element LD and a third power source line PL3. The third power source line PL3 may receive an initialization power source Vinit. A voltage of the initialization power source Vinit may be set to a voltage less than a threshold voltage of the light emitting diode LD at which the light emitting element LD turns off when the initialization power source Vinit is supplied to the first electrode of the light emitting element LD.

An actual operation process of the pixel PXijc of FIG. 10 may be the same as that of the pixel of FIG. 3, except that the fifth transistor M5*c* is connected to the third power source line PL3.

FIGS. 11 to 14 are diagrams illustrating electronic devices according to various embodiments.

Figure 11:
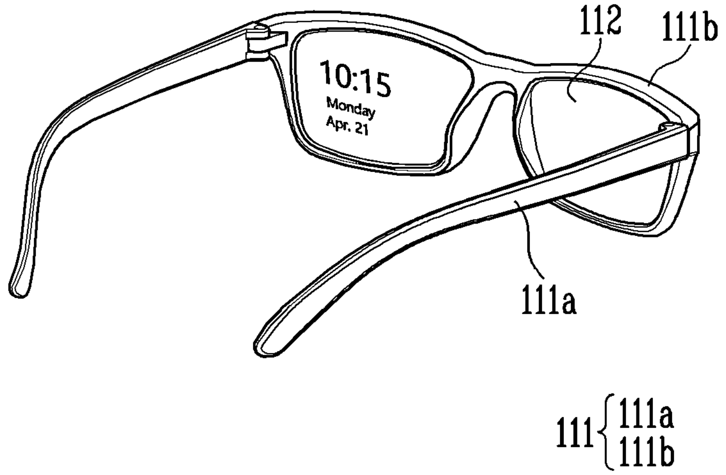
FIGS. 11, 12, 13 and 14 are diagrams illustrating electronic devices according to various embodiments.

Referring to FIG. 11, the display device 100 according to the above-described embodiments may be applied to smart glasses. The smart glasses may include a frame 111 and a lens unit 112. The smart glasses may be a wearable electronic device that can be worn on a user's face, and may have a structure in which a portion of the frame 111 is folded or unfolded. For example, the smart glasses may be a wearable device for augmented reality (AR).

The frame 111 may include a housing 111*b* supporting the lens unit 112 and leg parts 111*a* for a user to wear. The leg parts 111*a* may be connected to the housing 111*b* by hinges and may be folded or unfolded.

A battery, a touch pad, a microphone, a camera, etc. may be built into the frame 111. Also, a projector that outputs light, a processor that controls an optical signal, etc. may be built into the frame 111.

The lens unit 112 may be an optical member that transmits or reflects light. The lens unit 112 may include glass, transparent synthetic resin, etc.

The display device 100 according to the above-described embodiments may be applied to the lens unit 112. As an example, a user may visually recognize an image displayed by an optical signal transmitted from the projector of the frame 111 through the lens unit 112. For example, the user may visually recognize information such as time and date displayed on the lens unit 112.

Figure 12:
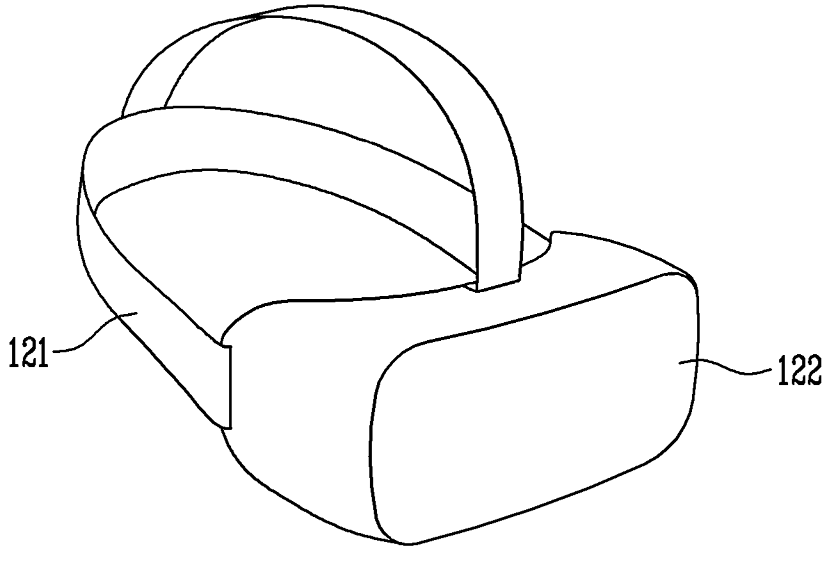

Referring to FIG. 12, the display device 100 according to the above-described embodiments may be applied to a head-mounted display (HMD). The head-mounted display may include a head-mounting band 121 and a display storage case 122. For example, the head-mounted display may be a wearable electronic device that can be worn on a user's head.

The head-mounting band 121 may be connected to the display storage case 122 and may securely fix the display storage case 122 to a user's head. The head-mounting band 121 may include a horizontal band and a vertical band to secure the head-mounted display to the user's head. The horizontal band may be provided to surround the side of the user's head, and the vertical band may be provided to surround the top of the user's head. However, the present inventive concept is not necessarily limited thereto, and the head-mounting band 121 may be implemented in the form of a glasses frame or a helmet.

The display storage case 122 may accommodate the display device 100 and may include at least one lens. At least one lens may provide an image to the user. For example, the display device 100 according to the above-described embodiments may be applied to left-eye lens and right-eye lens implemented within the display storage case 122.

Figure 13:
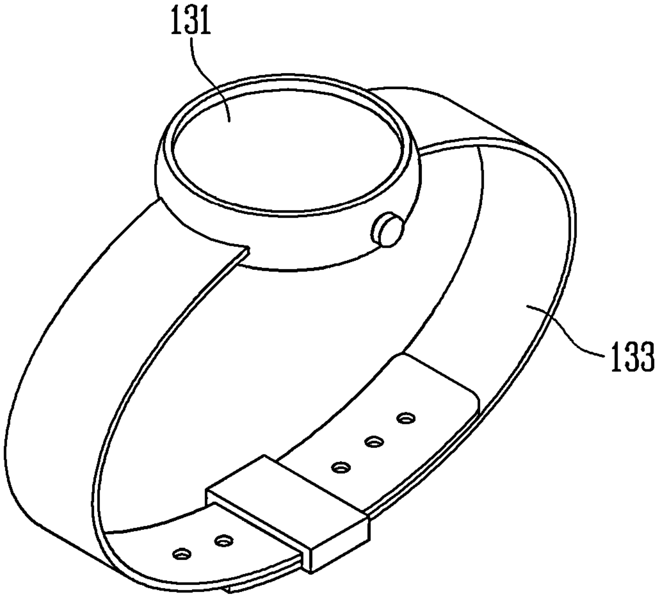

Referring to FIG. 13, the display device 100 according to the above-described embodiments may be applied to a smart watch. The smart watch may include a display unit 131 and a strap unit 133. The smart watch may be a wearable electronic device, and the strap unit 133 may be mounted on a user's wrist. The display device 100 according to the above-described embodiments may be applied to the display unit 131. For example, the display unit 131 may provide image data including information such as time and date.

Figure 14:
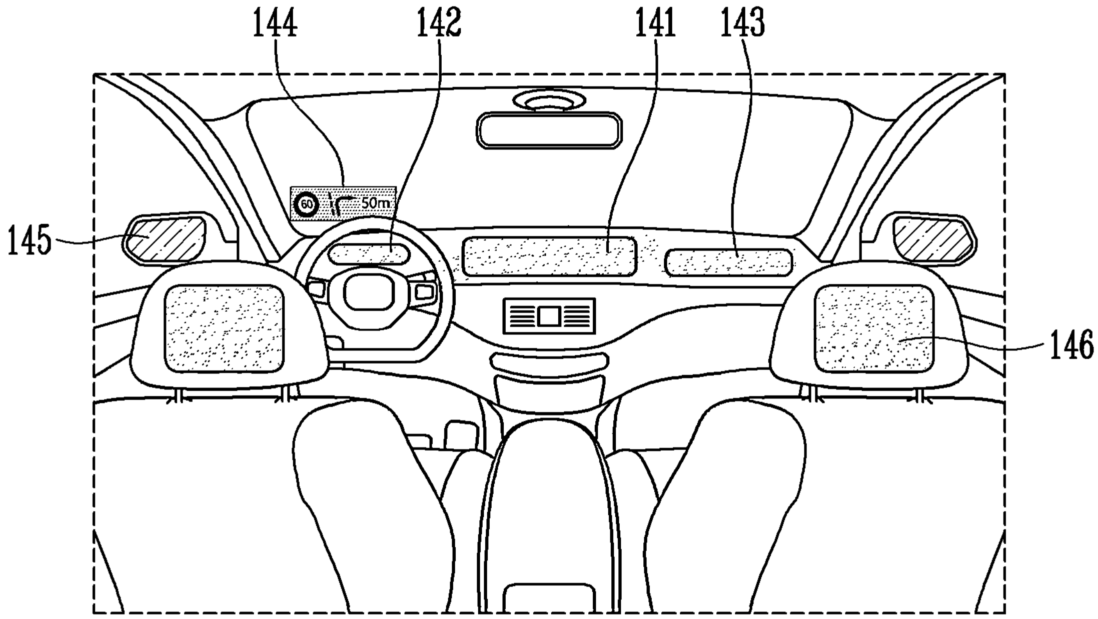

Referring to FIG. 14, the display device 100 according to the above-described embodiments may be applied to an automotive display. As an example, the automotive display may refer to an electronic device provided inside and outside a vehicle to provide image data.

For example, the display device 100 according to the above-described embodiments may be applied to at least one of an infotainment panel 141, a cluster 142, a co-driver display 143, a head-up display 144, a side mirror display 145, and a rear seat display 146 provided in a vehicle.

The pixel according to the embodiments of the present inventive concept may be applied to a high-resolution display panel because it can compensate for a threshold voltage of the driving transistor using five transistors and two (or three) capacitors.

However, effects of the present inventive concept are not limited to the above-described effects, and may be variously extended without departing from the spirit and scope of the present inventive concept.

As described above, preferred embodiments of the present inventive concept have been described with reference to the drawings. However, those skilled in the art will appreciate that various modifications and changes can be made to the present inventive concept without departing from the spirit and scope of the inventive concept as set forth in the appended claims.

What is claimed is:

1. A pixel comprising:

a first transistor having a first electrode electrically connected to a first power source line, a second electrode, and a gate electrode connected to a first node;

a light emitting element connected between the second electrode of the first transistor and a second power source line;

a second transistor connected between the first node and a data line and having a gate electrode electrically connected to a first scan line, the first scan line transmitting a first scan signal;

a third transistor connected between the first electrode of the first transistor and a second node and having a gate electrode electrically connected to a first emission control line;

a fourth transistor connected between the first power source line and the second node and having a gate electrode electrically connected to a second emission control line;

a fifth transistor including a first electrode connected to a first electrode of the light emitting element and a gate electrode electrically connected to a second scan line, the second scan line transmitting a second scan signal different from the first scan signal; and a first capacitor connected between the first node and the second node, wherein a reference power source and a voltage of a data signal are sequentially supplied to the data line during a horizontal period, wherein an enable period of the first scan signal is longer than an enable period of the second scan signal, and wherein the horizontal period includes a first period and a second period, and the second transistor, the third transistor and the fifth transistor are turned on during the first period and the second period.

2. The pixel of claim 1, wherein the fifth transistor includes a second electrode connected to the second power source line.

3. The pixel of claim 2, further comprising:

a second capacitor connected between the second node and the second scan line.

4. The pixel of claim 3, further comprising:

a third capacitor connected between the second node and the first power source line.

5. The pixel of claim 2, wherein the horizontal period further includes a third period, a fourth period and a fifth period, wherein the fifth transistor is turned on during the first to third periods, wherein the second transistor is turned on during the first to fourth periods, wherein the fourth transistor is turned off during the second to fourth periods, and wherein the third transistor is turned off during the third to fifth periods.

6. The pixel of claim 5, wherein the reference power source is supplied to the data line during the first and second periods, and the voltage of the data signal is supplied to the data line during the third and fourth periods.

7. The pixel of claim 2, wherein the horizontal period further includes a third period, a fourth period and a fifth period, wherein the fifth transistor is turned on during the first to third periods, wherein the second transistor is turned on during the first to fourth periods, wherein the fourth transistor is turned off during the first to fourth periods, and wherein the third transistor is turned off during the third to fifth periods.

8. The pixel of claim 7, wherein the reference power source is supplied to the data line during the first and second periods, and the voltage of the data signal is supplied to the data line during the third and fourth periods.

9. The pixel of claim 2, further comprising:

a second capacitor connected between the second node and the first emission control line.

10. The pixel of claim 1, wherein a first driving power source is supplied to the first power source line, and a second driving power source lower than the first driving power source is supplied to the second power source line, and wherein the reference power source has a lower voltage than the first driving power source.

11. A pixel comprising:

a first transistor having a first electrode electrically connected to a first power source line, a second electrode, and a gate electrode connected to a first node;

a light emitting element connected between the second electrode of the first transistor and a second power source line;

a second transistor connected between the first node and a data line and having a gate electrode electrically connected to a first scan line;

a third transistor connected between the first electrode of the first transistor and a second node and having a gate electrode electrically connected to a first emission control line;

a fourth transistor connected between the first power source line and the second node and having a gate electrode electrically connected to a second emission control line;

a fifth transistor connected between a first electrode of the light emitting element and a third power source line and having a gate electrode electrically connected to a second scan line;

a first capacitor connected between the first node and the second node; and a second capacitor connected between the second node and the second scan line, wherein a reference power source and a voltage of a data signal are sequentially supplied to the data line during a horizontal period.

12. The pixel of claim 11, wherein an initialization power source is supplied to the third power source line, and the light emitting element is turned off when the initialization power source is supplied to the first electrode of the light emitting element.

13. An electronic device comprising:

a host system; and a display device receiving input data and a control signal from the host system, wherein the display device includes:

pixels connected to first scan lines, second scan lines, first emission control lines, second emission control lines, and data lines;

a scan driver driving the first scan lines and the second scan lines;

an emission driver driving the first emission control lines and the second emission control lines; and a data driver driving the data lines, wherein a pixel located on an i-th horizontal line (i is a natural number) and a j-th vertical line (j is a natural number) includes:

a first transistor having a first electrode electrically connected to a first power source line, a second electrode, and a gate electrode connected to a first node;

a light emitting element connected between the second electrode of the first transistor and a second power source line;

a second transistor connected between the first node and a j-th data line and turned on when an enable first scan signal is supplied to an i-th first scan line;

a third transistor connected between the first electrode of the first transistor and a second node and turned off when a disable first emission control signal is supplied to an i-th first emission control line;

a fourth transistor connected between the first power source line and the second node and turned off when a disable second emission control signal is supplied to an i-th second emission control line;

a fifth transistor including a first electrode connected to a first electrode of the light emitting element and turned on when an enable second scan signal is supplied to an i-th second scan line; and a first capacitor connected between the first node and the second node, wherein a horizontal period in which the pixel is driven includes a first period, a second period, a third period, a fourth period, and a fifth period, wherein the data driver supplies a voltage of a reference power source to the j-th data line during the first and second periods, and supplies a voltage of a data signal to the j-th data line during the third and fourth periods, wherein a period of the enable first scan signal is longer than a period of the enable second scan signal, and wherein the second transistor, the third transistor and the fifth transistor are turned on during the first period and the second period.

14. The electronic device of claim 13, wherein the fifth transistor includes a second electrode connected to the second power source line.

15. The electronic device of claim 14, wherein the scan driver supplies the enable first scan signal to the i-th first scan line during the first to fourth periods, and supplies the enable second scan signal to the i-th second scan line during the first to third periods, and wherein the emission driver supplies the disable first emission control signal to the i-th first emission control line during the third to fifth periods, and supplies the disable second emission control signal to the i-th second emission control line during the second to fourth periods.

16. The electronic device of claim 14, wherein the scan driver supplies the enable first scan signal to the i-th first scan line during the first to fourth periods, and supplies the enable second scan signal to the i-th second scan line during the first to third periods, and wherein the emission driver supplies the disable first emission control signal to the i-th first emission control line during the third to fifth periods, and supplies the disable second emission control signal to the i-th second emission control line during the first to fourth periods.

17. The electronic device of claim 14, further comprising:

a second capacitor connected between the second node and the i-th second scan line.

18. The electronic device of claim 17, further comprising:

a third capacitor connected between the second node and the first power source line.

19. The electronic device of claim 14, further comprising:

a second capacitor connected between the second node and the i-th first emission control line.

20. The electronic device of claim 13, further comprising:

a second capacitor connected between the second node and the i-th second scan line, wherein the fifth transistor includes a second electrode connected to a third power source line.

* * * * *